United States Patent
Sawada et al.

(10) Patent No.: US 7,169,083 B2
(45) Date of Patent: Jan. 30, 2007

(54) DRIVING CONDITION CONTROL METHOD AND SYSTEM

(75) Inventors: Mamoru Sawada, Yokkaichi (JP); Toshiki Matsumoto, Kariya (JP); Tsutomu Tashiro, Nagoya (JP); Mamoru Mabuchi, Kariya (JP); Takehito Fujii, Anjo (JP); Motoaki Kataoka, Kariya (JP)

(73) Assignee: Denso Corporation, Kariya (JP)

( * ) Notice: Subject to any disclaimer, the term of this patent is extended or adjusted under 35 U.S.C. 154(b) by 226 days.

(21) Appl. No.: 10/869,033

(22) Filed: Jun. 17, 2004

(65) Prior Publication Data

US 2004/0262067 A1  Dec. 30, 2004

(30) Foreign Application Priority Data

Jun. 18, 2003  (JP) .............................. 2003-173854

(51) Int. Cl.
*B60W 10/06* (2006.01)
(52) U.S. Cl. ...................................................... 477/183
(58) Field of Classification Search ................ 477/183, 477/184, 185; 180/197
See application file for complete search history.

(56) References Cited

U.S. PATENT DOCUMENTS

| | | | | |
|---|---|---|---|---|
| 5,627,756 A | * | 5/1997 | Fukada et al. ............... | 180/197 |
| 5,908,225 A | * | 6/1999 | Meier .......................... | 180/197 |
| 6,007,454 A | * | 12/1999 | Takahira et al. ............. | 477/185 |
| 6,466,857 B1 | * | 10/2002 | Belvo .......................... | 180/197 |
| 6,644,428 B2 | * | 11/2003 | Gady et al. .................. | 180/197 |
| 6,691,013 B1 | * | 2/2004 | Brown ......................... | 180/197 |
| 6,923,514 B1 | * | 8/2005 | Spieker et al. .............. | 180/197 |
| 2003/0230933 A1 | * | 12/2003 | Schneider et al. ........... | 303/146 |

FOREIGN PATENT DOCUMENTS

| | | |
|---|---|---|
| JP | 7-108842 | 4/1995 |
| JP | 8-207542 | 8/1996 |

* cited by examiner

*Primary Examiner*—Sherry Estremsky
(74) *Attorney, Agent, or Firm*—Posz Law Group, PLC

(57) ABSTRACT

In a driving condition control system, a sensing unit senses a first physical quantity indicative of a rotation of the first rotatable axle assembly and a second physical quantity indicative of a rotation of the second rotatable axle assembly. A determining unit compares the first and second physical quantities of the rotations of the first and second rotational axle assemblies and determines whether a driving condition of the vehicle is unstable according to the compared result. As a result, the unstable condition of the vehicle can be rapidly detected without detecting a yaw moment of the vehicle.

27 Claims, 8 Drawing Sheets

DRIVING CONDITION CONTROL METHOD AND SYSTEM

BACKGROUND OF THE INVENTION

The present invention relates to a driving condition control method and system installed in a vehicle, which are capable of controlling the driving conditions of the vehicle.

Conventional driving condition control systems have been created, one of which is disclosed in Japanese Unexamined Patent Publication No. H08-207542, and another one of which disclosed in Japanese Granted Patent Publication No. 3116686.

The driving condition control system disclosed in the former publication, when the vehicle runs over a road surface and a yaw sensor attached to the front portion of the vehicle body senses large amount of yaw moment, determines that the vehicle is experiencing understeer. The understeer means that a condition where the front of the vehicle tends to break out and slide toward the outside of an intended turn.

On the other hand, when a yaw sensor attached to the rear portion of the vehicle body senses large amount of yaw moment, the driving condition control apparatus determines that the vehicle is experiencing oversteer. The oversteer means that a condition in cornering when the rear wheels of a vehicle tend to break loose and slide outward so that the front turns the inside of an intended turn.

The driving condition control apparatus performs a front-rear torque distribution control for restraining the oversteer or the understeer, and/or performs a steering control for avoiding the oversteer or the understeer.

Moreover, the driving condition control apparatus disclosed in the later publication is equipped with a variable torque transmission. When the vehicle runs over the road surface, the variable torque transmission distributes torque between the right and left wheels on at least one of the axel to be satisfied with the driver's steering angle, the running speed of the vehicle, and so on.

The apparatus disclosed in the former publication controls the driving conditions of the vehicle according to the amount of yaw moment. It is noted that the yaw moment indicates angular motion of the vehicle body about vertical axis through its center of gravity. The angular motion of the vehicle body is caused after the driving torque produced by the engine is transmitted to the wheels so that the tires are subjected to traction force from the road surface.

That is, the apparatus disclosed in the former publication only carries out the driving condition control after the yaw moment of the vehicle body is produced, which may delay the detection of the vehicle's driving conditions.

The apparatus disclosed in the later publication only performs the torque distribution so that it is difficult to rapidly detect that the vehicle's driving conditions are different from driver's intended driving conditions.

SUMMARY OF THE INVENTION

The present invention is made on the background.

Accordingly, it is an object of the present invention to provide a driving condition control method and apparatus, which are capable of rapidly detecting the vehicle's driving conditions that are different from driver's intended driving conditions.

According to one aspect of the present invention, there is provided a driving condition control system. The driving condition control system is installed in a vehicle. The vehicle has a source of power for generating power, a first rotatable axle assembly to which a front wheel is attached, and a second rotatable axle assembly to which a rear wheel is attached, said power being transferred to the second rotatable axle assembly so that the second rotatable axle assembly is rotated. The driving condition control system comprises a sensing unit configured to sense a first physical quantity indicative of a rotation of the first rotatable axle assembly and a second physical quantity indicative of a rotation of the second rotatable axle assembly. The driving condition control system also comprises a determining unit configured to compare the first and second physical quantities of the rotations of the first and second rotational axle assemblies and to determine whether a driving condition of the vehicle is unstable according to the compared result.

According to another aspect of the present invention, there is provided a program product having a computer-readable medium of an electronic control unit. The computer-readable medium stores therein a program. The electronic control unit is installed in a vehicle. The vehicle has a source of power for generating power, a first rotatable axle assembly to which a front wheel is attached, and a second rotatable axle assembly to which a rear wheel is attached. The power is transferred to the second rotatable axle assembly as torque so that the second rotatable axle assembly is rotated. The vehicle also has a sensing unit that senses a first physical quantity indicative of a rotation of the first rotatable axle assembly and a second physical quantity indicative of a rotation of the second rotatable axle assembly. The program causes a electronic control unit to receive the first physical quantity indicative of the rotation of the first rotatable axle assembly and the second physical quantity indicative of the rotation of the second rotatable axle assembly from the sensing unit. The program causes a electronic control unit to compare the first and second physical quantities of the rotations of the first and second rotational axle assemblies. The program causes a electronic control unit to determine whether a driving condition of the vehicle is unstable according to the compared result. The program causes a electronic control unit to, when the determining unit determines that the vehicle becomes one of the first and second unstable conditions, adjust the torque transferred to the second axle assembly.

According to further aspect of the present invention, there is provided a method of controlling a driving condition of a vehicle. The vehicle has a source of power for generating power, a first rotatable axle assembly to which a front wheel is attached, and a second rotatable axle assembly to which a rear wheel is attached. The power is transferred to the second rotatable axle assembly so that the second rotatable axle assembly is rotated. The method comprises sensing a first physical quantity indicative of a rotation of the first rotatable axle assembly and a second physical quantity indicative of a rotation of the second rotatable axle assembly. The method also comprises comparing the first and second physical quantities of the rotations of the first and second rotational axle assemblies to determine whether a driving condition of the vehicle is unstable according to the compared result.

BRIEF DESCRIPTION OF THE DRAWINGS

Other objects and aspects of the invention will become apparent from the following description of embodiments with reference to the accompanying drawings in which.

DETAILED DESCRIPTION OF EMBODIMENTS
OF THE INVENTION

Embodiments of the invention will be described hereinafter with reference to the accompanying drawings.

(First Embodiment)

Figure 1:
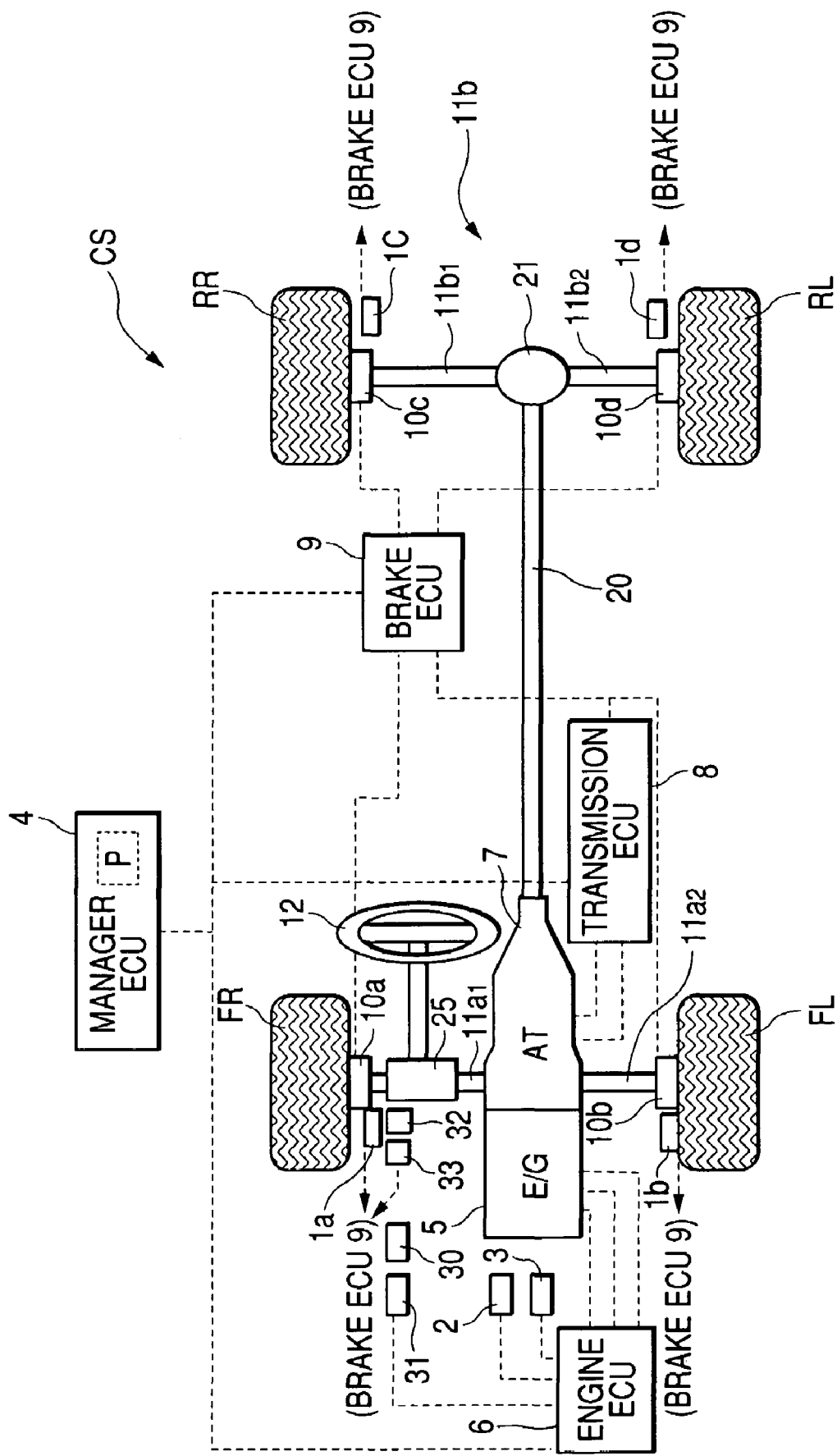
FIG. 1 is a schematic structural view of a driving condition control system according to a first embodiment of the present invention.

FIG. 1 is a schematic structural view of a driving condition control system according to a first embodiment of the present invention, The driving condition control system CS is installed in a vehicle, such as four-wheel automobile, V that is a type of front-engine-rear-drive vehicles.

That is, the vehicle V is provided with an engine 5, a drive shaft 20, and an automatic transmission (AT) 7 having a gear box and mechanically connected between the engine 5 and one end of the drive shaft 20. The AT 7 changes the gear ratios of the gear box independently of the driver to convert the engine's power output to torque based on the gear ratios, thereby transferring the torque to the drive shaft 20.

The vehicle V is also provided with a front axle assembly (rolling axle assembly) 11a and a rear axle assembly (drive axle assembly) 11b. The front axle assembly 11a has a supporting member, a right-front axle 11a1, and a left-front axle 11a2 that are individually rotatably supported therewith. Front left and right wheels FL and FR are fixed to the right-front axle 11a1 and the left-front axle 11a2, respectively.

The rear axle assembly 11b has a center differential 21 with right-rear axle assembly 11b1 and left-rear axle 11b2 (half shafts) coupling right and left rear wheels RR and RL to the differential 21, respectively.

The differential 21 is mechanically coupled to the other end of the drive shaft 20.

The left-rear axle 11b2 is supported at its one end with the differential 21 to be rotatable around its axial direction orthogonal to the axial direction of the drive shaft 20. Similarly, the right-rear axle 11 is supported at its one end with the differential 21 to be rotatable around its axial direction orthogonal to the drive shaft's axial direction.

The differential 21 converts the rotation of the drive shaft DF to each rotation of each of the right and left rear wheels (right and left rear axles 11b1 and 11b2), and allows the right and left rear wheels RR and Rl to revolve at different speeds during turns.

To the front and rear wheels FR, FL, RR, and RL, for example, drum brakes (not shown) are attached, respectively. Each of the drum brakes has a drum attached to each of the wheels and rotatable together therewith. Each of the drum brakes has brake shoes fit inside thereof.

In addition, the vehicle V has a steering wheel 12 that the driver can operate and a steering mechanism 25 mechanically connected to the steering wheel 12 and the front right and left wheels FR and FF. The driver's steering operation of the steering wheel 12 allows the front right and left wheels FR and FL to steer, thereby turning (steering) the vehicle V.

On the other hand, the driving condition control system CS is equipped with a plurality of sensors $1a$–$1d$, 2, and 3, a manager ECU (Electronic Control Unit) 4, an engine ECU 6, a transmission ECU 8, brake ECU 9, and braking force generating units $10a$–$10d$.

The sensors include wheel speed sensors $1a$–$1d$, an engine revolution sensor 2, and an intake air mass sensor 3.

The wheel speed sensors $1a$, $1b$, $1c$, and $1d$ are disposed close to the wheels FR, FL, RR, and RL, respectively. The wheel speed sensors $1a$–$1d$ are electrically connected to, for example, each of the ECUs 4, 6, 8, and 9.

The wheel speed sensors $1a$–$1d$ sense the wheel speeds of the wheels FR-RL to output the sensed wheel speeds as wheel speed signals of the wheels FR-FL to the brake ECU 9.

Each of the wheel speed signals can be used for calculating the wheel speed of each of the wheels FR-RL, the speed Vso of the vehicle body, the slip ratio indicative of how much slipping is occurring between the wheels FR-RL and the road surface, and the like.

In addition, in this first embodiment, each of the wheel speed signals can be used for calculating rotational state of each of the front and rear axle assemblies 11a and 11b to which the wheels are attached. That is, the wheel speed signals allow physical quantity indicative of the rotation of each of the front and rear axle assemblies 11a and 11b. In this first embodiment, as an example of physical quantity, the rotational speeds Vd and Vr of the driving axle assembly (rear axle assembly) 11b and the front axle assembly 11a are used. Incidentally, as another example of physical quantity, the revolutions of the rear axle assembly 11b and the front axle assembly 11a may be used.

The engine revolution sensor 2 is electrically connected to the engine ECU 6 and operative to output an engine revolution signal indicative of the revolution of the engine 5 that is served as power source for generating power (torque), thereby outputting the engine revolution signal to the engine ECU 6. The intake air mass sensor 3 senses intake air mass of the engine 5 to output the sensed intake air mass as intake air mass signal to the engine ECU 6.

In this first embodiment, the driving condition control system CS includes the engine revolution sensor 2 and the intake air mass sensor 3, but they can be omitted from the structure of the system CS. In this modification, the engine revolution and the intake air mass can be estimated according to an engine control signal outputted from the engine ECU 6.

The manager ECU 4 receives the engine control signal outputted from the engine ECU 6 and a transmission control signal outputted from the transmission ECU 8. The manager ECU 4 also receives a brake control signal outputted from the brake ECU 9 and the wheel speed signals outputted from the wheel speed sensors 1*a*–1*d*. The manager ECU 4 performs various operations including any one of an engine control operation, a brake control operation, and a transmission control operation, for controlling the driving conditions of the vehicle V according to the received signals.

The manager ECU 4 outputs at least one control signal based on the operation result. At least one of the engine ECU 6, the brake ECU 9, and the transmission ECU 8 receives the at least one control signal to perform at least one of the control operations corresponding to the at least one control signal.

The engine ECU 6, which corresponds to, for example, a power control unit, is operative to control the power of the engine 5 according to the position of an accelerator pedal 30 that is operated by the drier and sensed by an accelerator pedal sensor 31. The accelerator pedal 30 determines to control the flow of fuel into the engine 5.

That is, the engine ECU 6 determines the engine control signal including a command that makes the engine 5 output predetermined engine power according to the position of the accelerator pedal 30, and the engine ECU 6 outputs the engine control signal to the engine 5.

In addition, the engine ECU 6 adjusts the predetermined power according to the received engine revolution signal, the received intake air mass signal, the control signal outputted from the manager ECU 4.

For example, the engine ECU 6 normally determines the engine power that corresponds to the position of the accelerator pedal 30 to generate the engine control signal indicative of the determined engine power.

When the control signal indicative of requiring the engine ECU 6 to reduce the amount of engine power is transmitted from the manager ECU 4 to the engine ECU 6, the engine ECU 6 calculates power control parameters, such as the torque of the engine and the engine revolution, which are required to reduce the amount of engine power. The engine ECU 6 outputs the engine control signal indicative of the calculated power control parameters to the engine 5. In the engine 5, the torque of the engine 5 and the engine revolution are adjusted according to the engine control signal, thereby reducing the amount of engine power.

The transmission ECU 8 is operative to change the gear ratios of the AT 7 according to the position of a shift lever (not shown). Namely, the transmission ECU 8 determines the transmission control signal indicative the predetermined gear ratios that correspond to the position of the shift lever, thereby outputting the transmission control signal to the AT 7. The transmission control signal allows the AT 7 to change its current gear ratios to the predetermined gear ratios that correspond to the position of the shift lever.

In addition, the transmission ECU 8 adjusts the predetermined gear ratios according to the received wheel speed signals outputted from the sensors 1*a*–1*d*, the control signal indicative of the torque calculated by the engine ECU 6, and so on. The transmission ECU 8 outputs the transmission control signal that allows the AT 7 to adjust the gear ratios to correspond to the engine torque and the wheel speeds. In the AT 7, the gear ratios are adjusted according to the transmission control signal.

On the other hand, each of the brake force generating units 10*a*–10*d* is electrically connected to each of the brakes and the brake ECU 9 described hereinafter. Each of the brake force generating units 10*a*–10*d* is provided with, for example, a wheel cylinder (W/C) that is mechanically connected to each of the brake shoes. Each of the wheel cylinders is operative to convert hydraulic pressure to mechanical force as the brake force, thereby applying it on each of the brake shoes.

That is, the mechanical force applied on each of the brake shoes causes each brake shoe to press against the inside of each of the brake drums, thereby stopping the rotation of each wheel by friction between each of the brake drums and each of the brake shoes.

The brake ECU 9, which corresponds to, for example, a brake control unit, is operative to control the brakes according to the position of a brake pedal 32 operated by the driver and sensed by a brake pedal sensor 33.

That is, the brake ECU 9 determines the brake control signal that allows each of the brake force generating units 10*a*–10*d* to generate predetermined brake force according to the position of the brake pedal 32, and the brake ECU 9 outputs the brake control signal to each of the brake force generating units 10*a*–10*d*.

In addition, the brake ECU 9 adjusts the predetermined brake force according to the received wheel speed signals outputted from the sensors 1*a*–1*d* and the control signal outputted from the manager ECU 4.

For example, the brake ECU 9 calculates the wheel speeds Vw and the vehicle body speed Vso of the vehicle body according to the wheel speed signals so as to calculate the slip ratio based on the calculated wheel speeds Vw and the vehicle body speed Vso. Subsequently, the brake ECU 9 detects a locking tendency in the wheels FR-RL according to the calculated slip ratio, thereby outputting to each of the brake force generating units 10*a*–10*d* the brake control Signal for ABS (Anti Lock Braking System) control. The brake control signal can prevent an event representing a rapid reduction in speed where one or more wheels begin to lock-up from occurring.

Each of the brake force generating units 10*a*–10*d* adjusts the generated brake force according to the brake control signal.

Next, processes of controlling the driving conditions of the vehicle V, which are performed by the driving condition control system CS, will be described hereinafter.

The driving condition control system CS according to the first embodiment, when the vehicle V becomes unstable, in other word, the driving condition of the vehicle V is unstable, performs control to avoid the unstable driving condition of the vehicle V. The "unstable driving condition" represents vehicle's driving conditions that are different from the driver's intended driving conditions. For example, when turning at a corner, the behaviors of the vehicle V shift from a driver's intended behavior, as shown in FIGS. 2A and 2B.

Figure 2A:
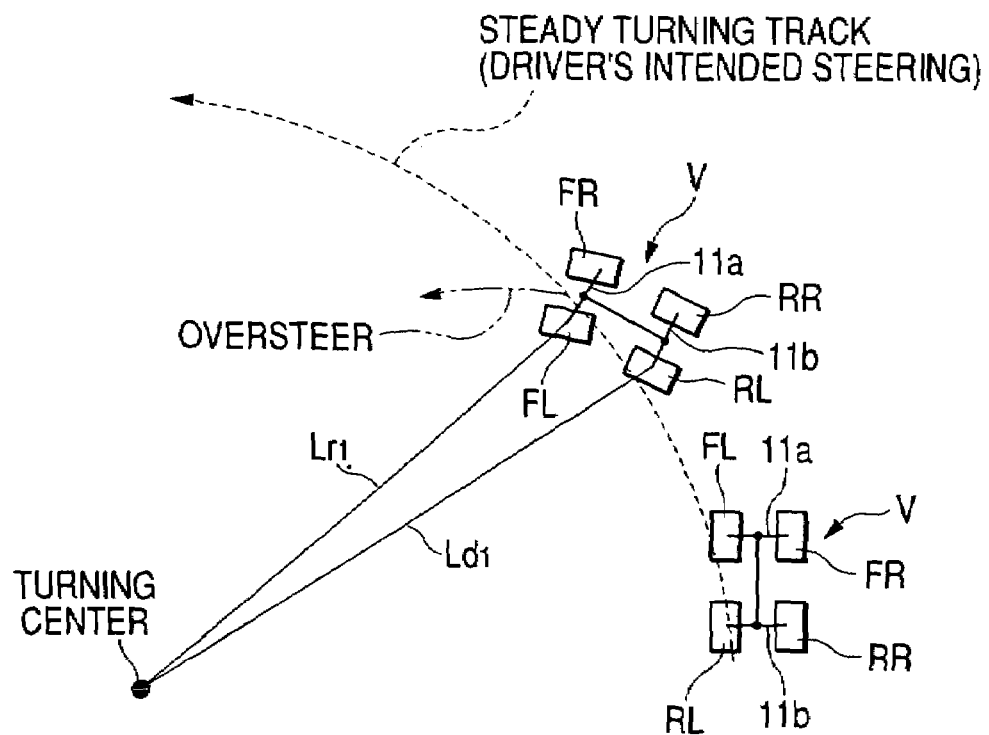
FIG. 2A is a view illustrating a condition that, when turning at a corner, the front portion of a vehicle shown in FIG. 1 turns or likely turns towards inside more than a steady turning track corresponding to a driver's intended steering by a steering wheel shown in FIG. 1 according to the first embodiment.
Figure 2B:
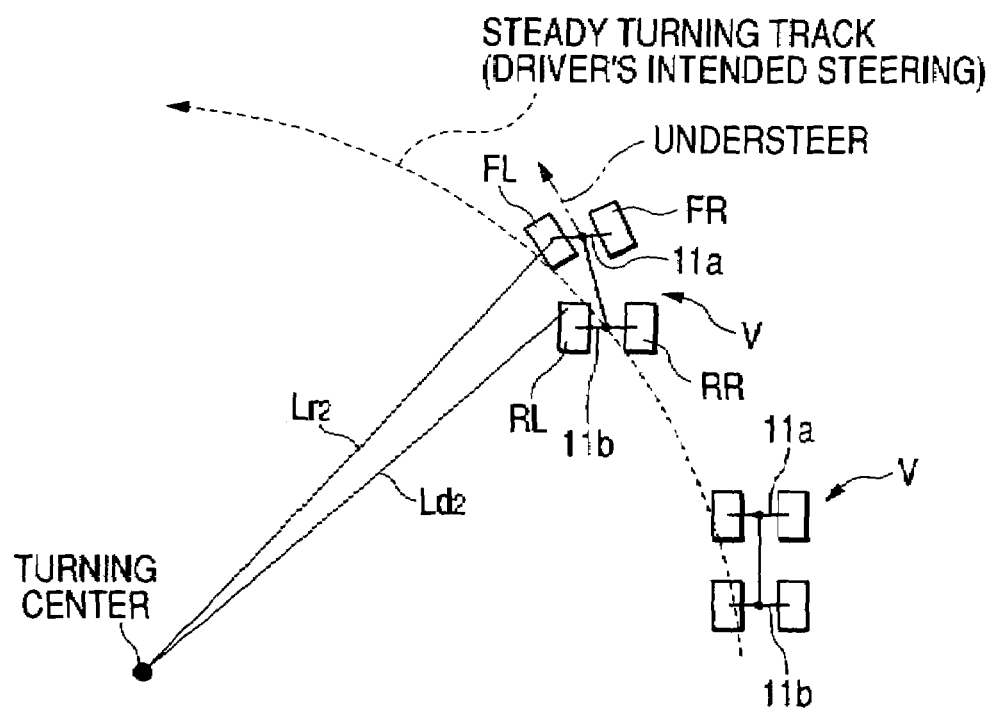
FIG. 2B is a view illustrating a condition that, when turning at a corner, the front portion of the vehicle turns or likely turns towards outside more than a steady turning track corresponding to the driver's intended steering by the steering wheel according to the first embodiment.

FIG. 2A shows a condition that, when turning at the corner, the front portion of the vehicle V turns or likely turns towards inside more than the steady turning condition corresponding to the driver's intended (inputted) steering by the steering wheel 12.

In FIG. 2A, the approximately circular broken line around a predetermined turning center represents the turning track based on the steady (stable) turning condition.

This driving condition shown in FIG. 2A is referred to as "unstable condition of inside turning", such as oversteer.

FIG. 2B shows a condition that, when turning at the corner, the front portion of the vehicle V slides or likely slides towards outside with respect to the steady turning track corresponding to the driver's intended (inputted) steering by the steering wheel 12.

This driving condition shown in FIG. 2B is referred to as "unstable condition of outside turning", such as understeer.

Then, it is noted that the rotational speed of the front axle assembly 11a to which the front wheels FR and FL are attached, in other words the rolling axle assembly 11a, is defined as "rolling axle speed Vr". Similarly, it is noted that the rotational speed of the rear axle assembly 11b to which the rear wheels RR and RL are attached, in other words the drive axle assembly 11b, is defined as "drive axle speed Vd".

In a case where the vehicle V drives in the unstable condition of inside turning (see FIG. 2A), the drive axle speed Vd is faster than the rolling axle speed Vr, which is represented as Vr<Vd. This relationship causes the turning radius Lr1 of the front right wheel FR around the turning center to be shorter than the turning radius Ld1 of the rear right wheel RR therearound, which is represented as Lr1<Ld1. This relationship is effected between the front left wheel FL and rear left wheel RL.

In contrast, in a case where the vehicle V drives in the unstable condition of outside turning (see FIG. 2B), the rolling axle speed Vr is faster than the drive axle speed Vd, which is represented as Vr>Vd. This relationship causes the turning radius Lr2 of the front right wheel FR around the turning center to be longer than the turning radius Ld2 of the rear right wheel RR therearound, which is represented as Lr2>Ld2. This relationship is aeffected between the front left wheel FL and rear left wheel RL.

These unstable conditions of the inside and outside turnings are caused by instability of energy transfer with respect to the front and rear wheels FR, FL, RR, and RL.

The unstable condition of the inside turning during, for example, acceleration occurs because excess acceleration energy to drive the rear wheels RR and RL is given to the drive axle, as compared with the steady turning condition.

In particular, excessive rotational energy given to the drive axle assembly 11b transferred from the engine 5 with respect to the traction limit of the road surface due to the friction coefficient μ causes the tire longitudinal forces acting on each of the rear wheels RR and RL to excessively increase. This invites the condition in that the corner force of the lateral forces to balance the centrifugal force decreases, in other words, oversteer.

The unstable condition of the outside turning during, for example, acceleration occurs because of excess energy transfer from the rear wheels RR and RL to the road surface, as compared with the steady turning condition.

In particular, excessive rotational energy given to the drive axle assembly 11b transferred from the engine 5 within the traction limit of the road surface due to the friction coefficient μ causes the vehicle's load on the wheels to decrease. This invites the condition in that the lateral forces acting on the front wheels FR and FL decrease so that the vehicle V becomes "push under" that is hard to turn even if the driver steers the steering wheel 12.

While the vehicle V is being accelerated, if the vehicle V becomes or tends to become the unstable condition of inside turning, decreasing the rotational energy (torque) transferred from the engine 5 to the drive axle assembly 11b in accordance with the driver's intention allows the tire lateral forces acting on the rear tires RR and RL to be kept. The tire lateral forces acting on the rear tires RR and RL permits the vehicle V to overcome the unstable condition.

If the vehicle V becomes or tends to become the unstable condition of outside turning during acceleration of the vehicle V, decreasing the rotational energy (torque) transferred from the engine 5 to the drive axle assembly 11b in accordance with the driver's intention allows the vehicle's load to shift to the front wheels FR and FL. This increases the tire lateral forces acting on the front tires FR and FL, making it possible to overcome the unstable condition.

On the other hand, the unstable condition of the inside turning during, for example, braking, occurs because the tire lateral forces acting on the front wheels FR and FL are excessively larger than those on the rear wheels RR and RL, as compared with the steady turning condition.

That is, the braking causes the vehicle's load to shift on the front wheels FR and FL so that the tire longitudinal forces acting on the rear wheels RR and RL are excessively large, and the tire lateral forces acting on the rear wheels RR and RL are smaller than those on the front wheels FR and FR.

In addition, the unstable condition of the outside turning during, for example, braking occurs because the tire lateral forces acting on the front wheels FR and FL are smaller than the corner forces that are required for balancing the centrifugal forces, as compared with the steady turning condition.

That is, the tire lateral forces acting on the rear wheels RR and RL are larger than those on the front wheels FR and FL.

While braking the vehicle V, therefore, if the vehicle V becomes or tends to become the unstable condition of inside turning, increasing the rotational energy (torque) transferred from the engine 5 to the drive axle assembly 11b in accordance with the driver's intention allows the vehicle's load on the rear wheels RR and RL to be sufficiently maintained. This allows the tire lateral forces acting on the rear tires RR and RL to increase, making it possible to overcome the unstable condition of the vehicle V.

If the vehicle V becomes or tends to become the unstable condition of outside turning during braking of the vehicle V, decreasing the torque transferred from the engine 5 to the drive axle assembly 11b in accordance with the driver's intention permits the front wheels FR and FL to be sufficiently subjected to the vehicle's load. This allows the lateral forces acting on the front wheels FR and FL to be sufficiently kept, making it possible to overcome the unstable condition.

That is, the driving condition control system CS according to the first embodiment performs the following processes on the basis of the above concept.

Figure 3:
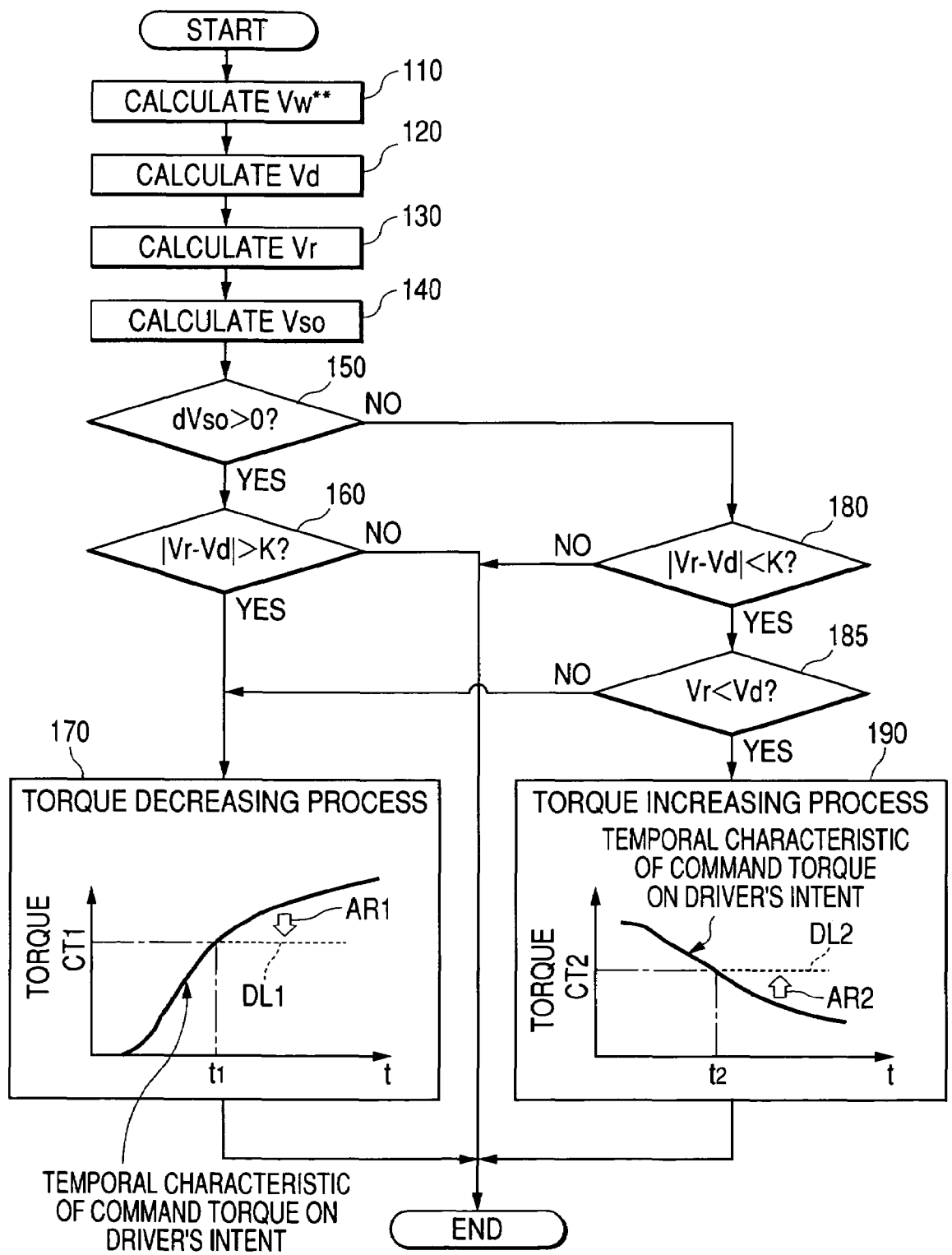
FIG. 3 is a flowchart schematically illustrating processes that a manager ECU (electronic control unit) shown in FIG. 1 executes according to the first embodiment.

FIG. 3 shows a flowchart of processes that the manager ECU 4 executes, explaining the processes of the driving condition control system CS in detail based on the flowchart. Incidentally, the manager ECU 4 performs these processes based on a program P previously installed in a computer-readable medium, such as ROM (Read Only Memory), RAM (Random Access Memory), a semiconductor memory and so on, which is installed in the manager ECU 4.

In step 110, the manager ECU 4 calculates the wheel speed Vw of each of the wheels FR, FL, RR, and RL according to the wheel speed signals outputted from the wheel speed sensors $1a–1d$. This reference character "Vw" collectively represents each of the wheel speeds of each of the wheels FR, FL, RR, and RL. Specifically, when representing the wheel speed of the front wheel FR, an identifier of the front wheel FR, such as "FR", is assigned to the character "**". Consequently, this process obtains each of the wheel speeds VwFR, VwFL, VwRR, and VwRL of each of the wheels FR, FL, RR, and RL.

In step 120, the manager ECU 4 calculates, as the drive axle speed Vd representing physical quantity of the rotation of the drive axle assembly (rear axle assembly) $11b$, an average value of the wheel speeds VwRR and VwRL of the rear wheels RR and RL.

In step 130, the manager ECU 4 calculates, as the rolling axle speed Vr representing physical quantity of the rotation of the rolling axle assembly (front axle assembly) $11a$, an average value of the wheel speeds VwFR and VwFL of the front wheels FR and FL.

In step 140, the manager ECU 4 calculates (estimates) the speed Vso of the vehicle body according to each of the wheel speeds VwFR, VwFL, VwRR, and VwRL, and differentiates the estimated vehicle body speed Vso to obtain a vehicle body acceleration dVso, One of known techniques in the ABS control can be used for calculating the vehicle body speed Vso, For example, an average value of all of the wheel speeds VwFR, VwFL, VwRR, and VwRL is utilized as the vehicle body speed Vso.

In step 150, the manager ECU 4 determines whether the vehicle body acceleration dvso exceeds zero (0), that is, whether the vehicle V is being accelerated or being braked.

When the determination is YES, that is, the vehicle body acceleration dVso exceeds zero, the manager ECU 4 shifts to step 160.

In step 160, the manager ECU 4 calculates the absolute value of the difference between the rolling axle speed Vr and the drive axle speed Vd, and determines whether the absolute value of the difference |Vr−Vd| exceeds a predetermined threshold value K. The threshold value K determines the permitted limit of the vehicle driving control so that the threshold value K is set to an extremely small value to distinct noise values. When the determination in step 160 is YES, that is, the absolute value of the difference |Vr−Vd| exceeds the threshold value K, the manager ECU 4 shifts to step 170. When the determination is NO, that is, the absolute value of the difference |Vr−Vd| is not more than the threshold value K, the manager ECU 4 determines that the absolute value of the difference |Vr−Vd| is due to the noise, terminating the processes.

In step 170, the manager ECU 4 performs torque-decreasing process. In this torque-decreasing process, the manager ECU 4 sets the condition for decreasing the torque. That is, this torque-decreasing process corresponds to a process for decreasing the torque that is transferred to the drive axle assembly $11b$ from the engine 5 according to the driver's intention.

In other words, this torque-decreasing process decreases the acceleration energy during acceleration to permits the vehicle V from being excessively accelerated.

Specifically, the manager ECU 4 controls the engine ECU 6 to decrease the power of the engine 5 (engine power), thereby decreasing the torque transferred to the drive axle assembly $11b$. Before decreasing the engine power in this process, the engine control signal outputted from the engine ECU 6 including a command that causes the engine 5 to output predetermined engine power corresponding to the position of the accelerator pedal 30 (driver's intention).

The manager ECU 4, therefore, outputs to the engine ECU 6 the control signal requesting the engine ECU 6 to decrease the predetermined engine power determined by the engine control signal. The engine ECU 6 adjusts the command torque corresponding to the predetermined engine power of the engine control signal independently of the position of the accelerator pedal 30.

For example, it is assumed that a temporal characteristic of the command torque transferred to the drive axle assembly $11b$ in response to the change of the accelerator pedal's position by the driver's operation is illustrated in step 170 of FIG. 3. This characteristic is obtained in a case where no driving condition control processes shown in FIG. 3 are performed (see solid curved line in step 170).

In this assumption, when determining that the absolute value of the difference |Vr−Vd| exceeds the threshold value K at an arbitrary time t1 in step 160, the manager ECU 4 outputs to the engine ECU 6 the control signal. The control signal requests the engine ECU 6 to decrease the predetermined engine power (command torque) determined by the engine control signal since the time t1.

The engine ECU 6 adjusts the predetermined engine power (command torque) of the engine control signal independently of the position of the accelerator pedal 30.

The temporary change of the command torque since the time t1 is illustrated by the dashed line DL1 in step 170 of FIG. 3, representing the decrease of the command torque by the arrow AR1 therein.

In step 170, as an example of the request, the manager ECU 4 may make the engine ECU 6 keep the predetermined engine power (command torque CT1), which is previously set at the time t1, since the time t1 (see the dashed line DL1 in step 170).

Figure 4A:
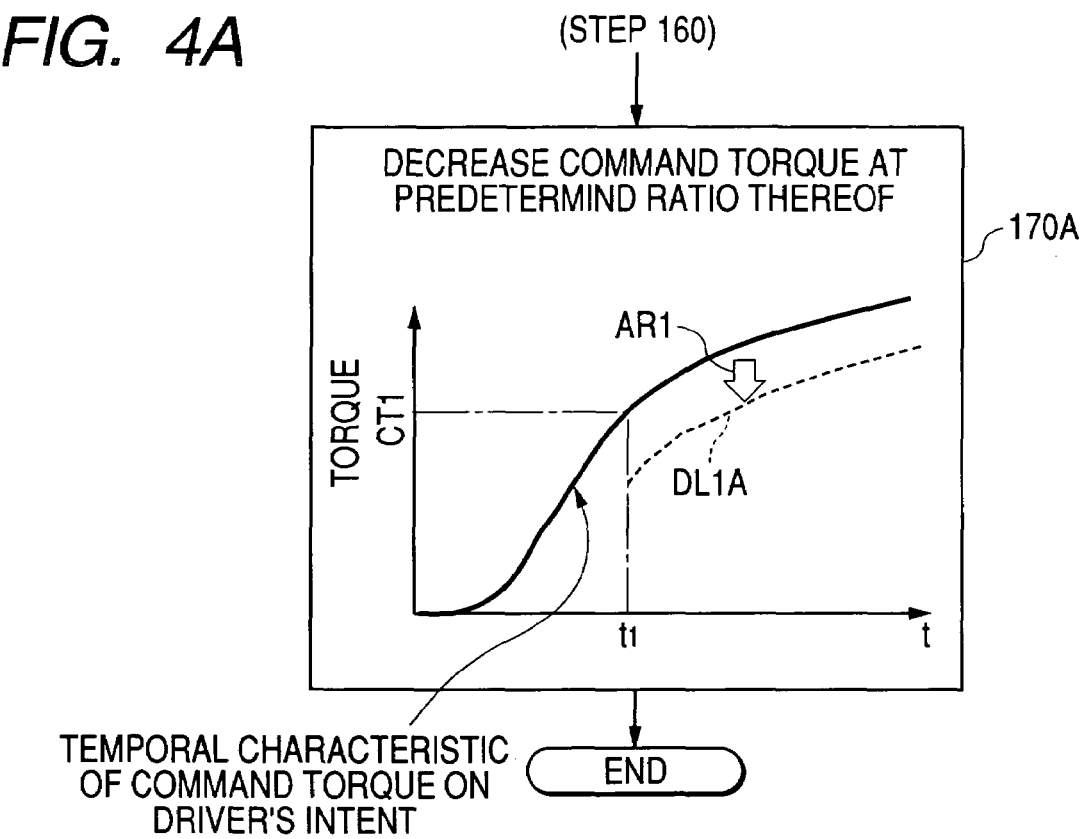
FIG. 4A is a flowchart schematically illustrating a process that the manager ECU executes according to the first embodiment.

As another example of the request, the manager ECU 4 may cause the engine ECU 6 to set the engine power to be smaller than the predetermined engine power (command torque) at a predetermined ratio of the command torque since the time t1 (see the dashed line DL1A in step 170A of FIG. 4A).

Figure 4B:
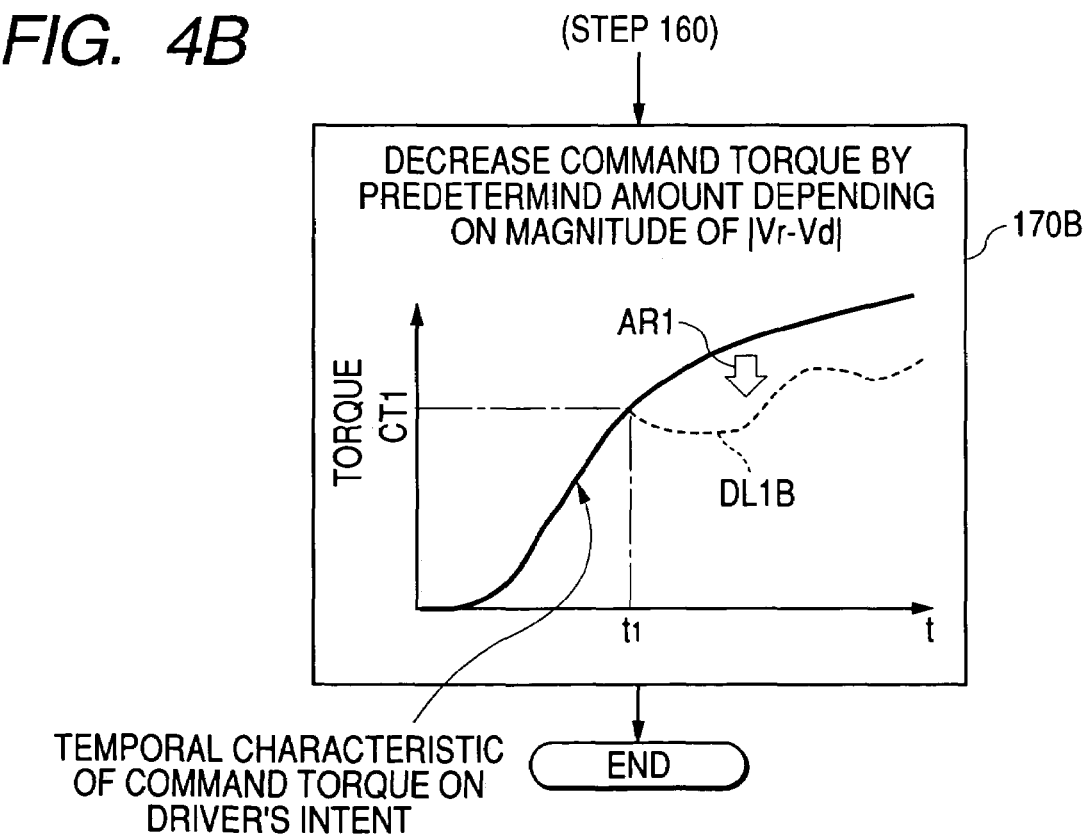
FIG. 4B is a flowchart schematically illustrating a process that the manager ECU executes according to the first embodiment.

As a further example of the request, the manager ECU 4 may cause the engine ECU 6 to set the engine power to be smaller than the predetermined engine power (command torque) by predetermined amount since the time t1. The predetermined amount may be set depending on the magnitude of the absolute value of the difference |Vr−Vd| since the time t1 (see the dashed line DL1B in step 170B of FIG. 4B).

As described above, reducing the torque transferred to the drive axle assembly $11b$ according to the driver's intention allows the engine power transferred to the drive axle assembly $11b$ to decrease.

This torque decreasing process allows, when the vehicle V becomes or tends to become the unstable condition of outside turning, the vehicle's load to shift to the front wheel side. This load shift permits the tire lateral forces acting on the front wheels FR and FL to increase, making it possible to overcome the unstable condition.

In addition, this torque decreasing process allows, when the vehicle V becomes or tends to become the unstable condition of inside turning, to sufficiently keep the tire lateral forces acting on the rear wheels RR and RL. These sufficient tire lateral forces permit the slips of the rear wheels RR and RL to be avoided, making it possible to overcome the unstable condition.

On the other hand, when the determination in step 150 is NO, that is, the vehicle body acceleration dVso is not more than zero, the manager ECU 4 shifts to step 180.

In step 180, as well as step 160, the manager ECU 4 calculates the absolute value of the difference between the rolling axle speed Vr and the drive axle speed Vd, and determines whether the absolute value of the difference |Vr−Vd| exceeds the predetermined threshold value K.

When the determination in step 180 is YES, that is, the absolute value of the difference |Vr−Vd| exceeds the threshold value K, the manager ECU 4 shifts to step 185. When the determination is NO, that is, the absolute value of the difference |Vr−Vd| is not more than the threshold value K, the manager ECU 4 determines that the absolute value of the difference |Vr−Vd| is due to the noise, terminating the processes.

In step 185, the manager ECU 4 determines whether the drive axle speed Vd is faster than the rolling axle speed Vr. When the determination in step 185 is YES, that is, the drive axle speed Vd is faster than the rolling axle speed Vr, the manager ECU 4 determines that the vehicle V becomes the unstable condition of inward turning, shifting to step 190. When the determination in step 185 is NO, that is, the drive axle speed Vd is not faster than the rolling axle speed Vr, the manager ECU 4 determines that the vehicle V becomes the unstable condition of outward turning, shifting to step 170 and performing the above torque decreasing process shown in step 170 (170A, 170B).

In step 190, the manager ECU 4 performs torque-increasing process. In this torque-increasing process, the manager ECU 4 sets the condition for increasing the torque. That is, this torque-increasing process corresponds to a process for increasing the torque that is transferred to the drive axle assembly 11*b* from the engine 5 according to the driver's intention.

In other words, this torque-increasing process increases the acceleration energy during acceleration to permits the vehicle V from being excessively braked.

Specifically, the manager ECU 4 controls the engine ECU 6 to increase the power of the engine 5 (engine power), thereby increasing the torque transferred to the drive axle assembly 11*b*. Before increasing the engine power in this process, the engine control signal outputted from the engine ECU 6 including a command that causes the engine 5 to output predetermined engine power corresponding to the position of the accelerator pedal 30.

The manager ECU 4, therefore, outputs to the engine ECU 6 the control signal requesting the engine ECU 6 to increase the predetermined engine power determined by the engine control signal. The engine ECU 6 adjusts the command torque corresponding to the predetermined engine power of the engine control signal independently of the position of the accelerator pedal 30.

For example, it is assumed that a temporal characteristic of the command torque transferred to the drive axle assembly 11*b* in response to the change of the accelerator pedal's position by the driver's operation is illustrated in step 190 of FIG. 3. This characteristic is obtained in a case where no driving condition control processes shown in FIG. 3 are performed (see solid curved line in step 190).

In this assumption, when determining that the vehicle V becomes the unstable condition of inward turning at an arbitrary time t2, the manager ECU 4 outputs to the engine ECU 6 the control signal requesting the engine ECU 6 to increase the predetermined engine power (command torque) determined by the engine control signal since the time t2.

The engine ECU 6 adjusts the predetermined engine power (command torque) of the engine control signal independently of the position of the accelerator pedal 30.

The temporary change of the command torque since the time t2 is illustrated by the dashed line DL2 in step 190 of FIG. 3, representing the decrease of the command torque by the arrow AR2 therein.

In step 190, as an example of the request, the manager ECU 4 may make the engine ECU 6 keep the predetermined engine power (command torque CT2), which is previously set at the time t2, since the time t2 (see the dashed line DL2 in step 190).

Figure 5A:
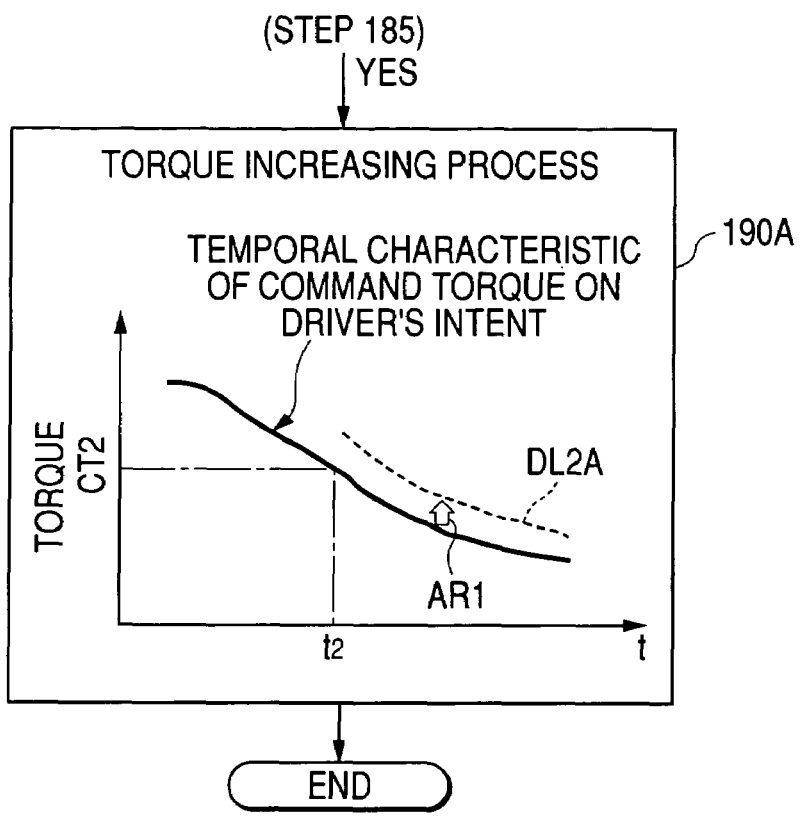
FIG. 5A is a flowchart schematically illustrating a process that the manager ECU executes according to the first embodiment.

As another example of the request, the manager ECU 4 may cause the engine ECU 6 to set the engine power to be larger than the predetermined engine power (command torque) at a predetermined ratio of the command torque since the time t2 (see the dashed line DL2A in step 190A of FIG. 5A).

Figure 5B:
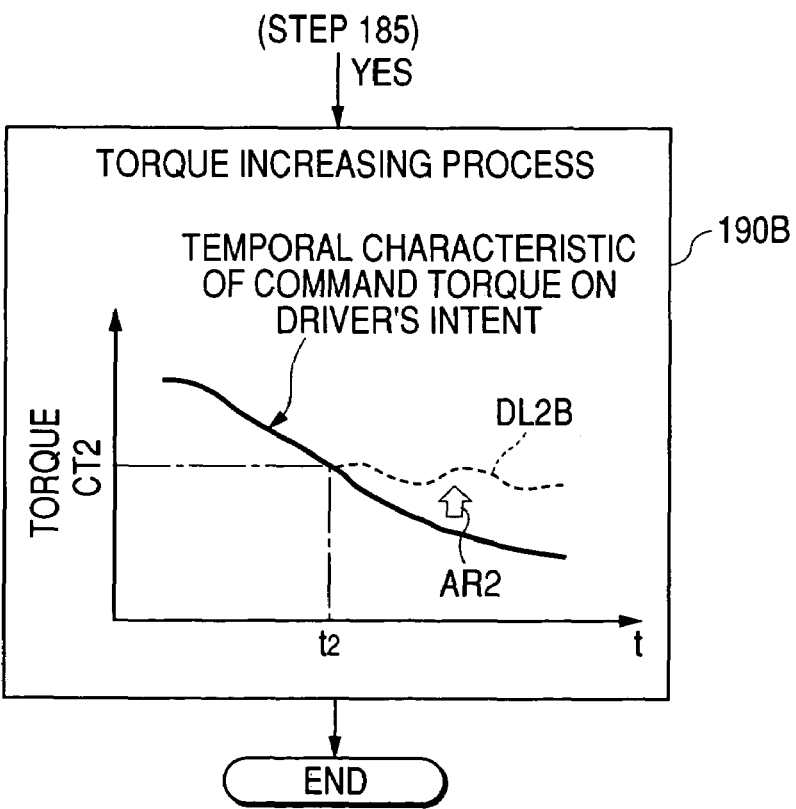
FIG. 5B is a flowchart schematically illustrating a process that the manager ECU executes according to the first embodiment.

As a further example of the request, the manager ECU 4 may cause the engine ECU 6 to set the engine power to be larger than the predetermined engine power (command torque) by predetermined amount since the time t2. The predetermined amount may be set depending on the magnitude of the absolute value of the difference |Vr−Vd| since the time t2 (see the dashed line DL2B in step 190B of FIG. 5B).

As described above, increasing the torque transferred to the drive axle assembly 11*b* according to the driver's intention allows the engine power transferred to the drive axle assembly 11*b* to increase.

This torque increasing process prevents, when the vehicle V becomes or tends to become the unstable condition of inside turning, the braking forces to the rear wheels RR and RL from excessively increasing. This allows the tire lateral forces acting on the rear wheels RR and RL to increase, making it possible to overcome the unstable condition.

In addition, when the vehicle V becomes or tends to become the unstable condition of outside turning, the above torque decreasing process shown in step 170 allows the vehicle's load to shift to the front wheel side. This load shift permits the tire lateral forces acting on the front wheels FR and FL to increase, making it possible to overcome the unstable condition.

These driving condition control processes allow the unstable conditions of inside turning and outside turning during acceleration and braking to be overcome.

Incidentally, if the vehicle V becomes the unstable condition of inside turning or that of outside turning when the vehicle V runs at a constant speed, the determination of the manager ECU 4 in step 150 is NO. Therefore, the manager ECU 4 similarly performs the above processes shown in steps 180, 185, and 190, thereby overcoming the unstable condition of inside turning or that of outside turning.

In this first embodiment, it is possible to detect the unstable condition of the vehicle V according to the rotational speeds of the rolling axle (front axle) 11*a* and the rear axle (drive axle) 11*b*. That is, using the rotational conditions of the front and rear axle assemblies 11*a* and 11*b*, which cause the yaw moment, permits the unstable conditions of the vehicle V to be detected. As a result, if the driving condition of the vehicle V is different from the driver's intended condition, such as, the vehicle V turns in oversteer or understeer, it is possible to rapidly precisely detect the unstable driving condition of the vehicle V.

Executing the feedback controls, such as the torque adjusting operations, based on rapidly and precisely detecting the unstable conditions of the vehicle V allows the unstable conditions to be rapidly precisely overcome.

(Second Embodiment)

In the above mentioned first embodiment, the manager ECU 4 carries out the increasing and decreasing of the engine power to adjust the torque transferred to the drive axle assembly 11b, thereby overcoming the unstable conditions of the vehicle V.

In contrast, the manager ECU 4 of the driving condition control system according to the second embodiment adjusts the torque based on another processes.

That is, generating the brake force allows the torque to be adjusted except for the decrease and increase of the engine power. In this second embodiment, the manager ECU 4 carries out the adjustment of the torque based on the braking force.

Processes executed by the manager ECU 4 according to the second embodiment are partially different from those executed by the manager ECU 4 according to the first embodiment so that these partially different processes of the management ECU 4 according to the second embodiment will be explained hereinafter. The remaining processes and the structure of the driving condition control system according to the second embodiment are substantially identical with those of the driving condition control system according to the first embodiment, so that explanations thereabout are omitted.

Figure 6A:
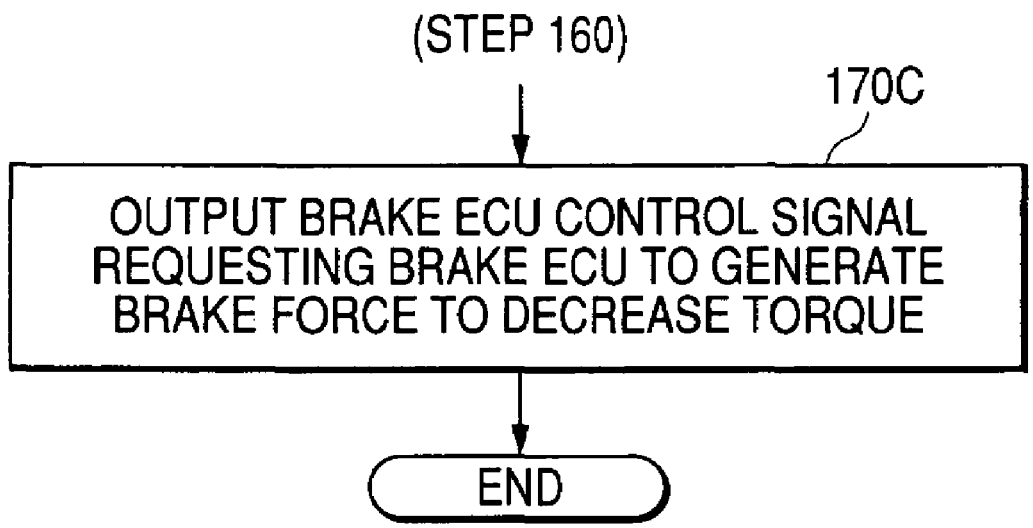
FIG. 6A is a flowchart schematically illustrating a process that the manager ECU executes according to a second embodiment of the present invention.

As shown in FIG. 6A, in place of the process in step 170 of FIG. 3, the manager ECU 4 makes the brake ECU 9 perform the brake force generation process through each of the brake force generating units 10a–10d without adjusting the command torque included in the engine control signal.

That is, the management ECU 4, for decreasing the torque, outputs to the brake ECU 9 the control signal requesting the brake ECU 9 to generate the brake force (step 170C). The brake ECU 9 produces the brake control signal in response to the reception of the control signal outputted form the manager ECU 4, thereby outputting the brake control signal to each of the brake force generating units 10a–10d.

Each of the brake force generating units 10a–10d applies the brake force (mechanical force) on each of the brake shoes, thereby braking each of the wheels FR, FL, RR, and RL.

As an example of the process in step 170C, the brake forces applied on the front and rear wheels FR, FL, RR, and RL may be approximately constant, or may be differently distributed between the front wheels FR, FL and the rear wheels RR, RL. The brake forces applied on the front and rear wheels FR, FL, RR, and RL may also be differently distributed between the inside wheels and the outside wheels during turning.

This structure allows the torque transferred to the drive axle assembly 11b to be smaller than predetermined torque. The predetermined torque corresponds to the position of the accelerator pedal 30 (driver's intention) when the driving condition of the vehicle V is stable.

This makes it possible to decrease the rotational energy (torque) transferred from the engine 5 to the drive axle assembly 11b in accordance with the driver's intention. As a result, it is possible to overcome the unstable conditions of inside turning and outside turning, respectively.

Figure 6B:
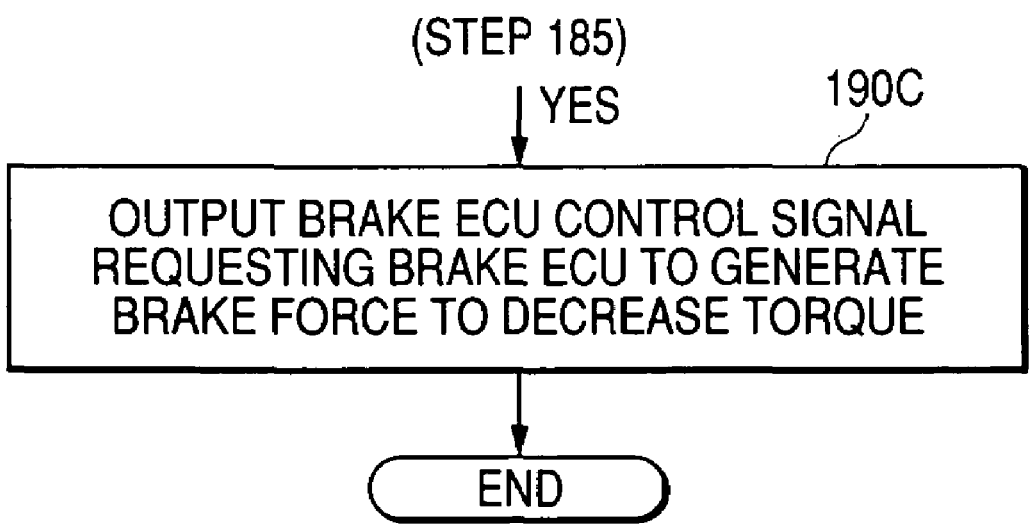
FIG. 6B is a flowchart schematically illustrating a process that the manager ECU executes according to the second embodiment of the present invention.

In addition, as shown in FIG. 6B, in place the process in step 190 of FIG. 3, the manager ECU 4 makes the brake ECU 9 adjust the brake forces, which have already been generated during braking, through the brake force generating units 10a–10d without adjusting the command torque included in the engine control signal.

That is, the management ECU 4, for increasing the torque, outputs to the brake ECU 9 the control signal requesting the brake ECU 9 to adjust the brake forces which have already been generated during braking (step 190C). The brake ECU 9 produces the brake control signal that requests each of the brake force generating units 10a–10d to weak each of the brake forces generated thereby according to the driver's operated position of the brake pedal 32 in response to the reception of the control signal outputted form the manager ECU 4. The brake ECU 9 outputs the brake control signal to each of the brake force generating units 10a–10d.

Each of the brake force generating units 10a–10d weaken the brake force (mechanical force) on each of the brake shoes independently of the driver's intention, thereby braking each of the wheels FR, FL, RR, and RL with the weakened brake force.

As an example of the process in step 190C, the brake forces applied on the front and rear wheels FR, FL, RR, and RL may be approximately constant, or may be differently distributed between the front wheels FR, FL and the rear wheels RR, RL. The brake forces applied on the front and rear wheels FR, FL, RR, and RL may also be differently distributed between the inside wheels and the outside wheels during turning.

For example, when the rolling axle speed Vr is faster than the drive axle speed Vd, the management ECU 4 may make the brake ECU 9 control to distribute that the magnitude of brake forces to the front wheels FR and FL is smaller than that of brake forces to the rear wheels RR and RL. In contrast, when the rolling axle speed Vr is later than the drive axle speed Vd, the management ECU 4 may make the brake ECU 9 control to distribute that the magnitude of brake forces to the front wheels FR and FL is larger than that of brake forces to the rear wheels RR and RL.

This structure allows the torque transferred to the drive axle assembly 11b to be larger than predetermined torque. The predetermined torque corresponds to the position of the accelerator pedal 30 (driver's intention) when the driving condition of the vehicle V is stable.

This makes it possible to increase the torque transferred from the engine 5 to the drive axle assembly 11b in accordance with the driver's intention. As a result, it is possible to overcome the unstable conditions of inside turning and outside turning, respectively.

(Other Embodiments)

These vehicle driving condition control processes according to the first and second embodiments can be performed at any time during the running of the vehicle.

When the vehicle 5 runs at very low speed, such as a speed less than a predetermined speed of 5 km/h, starts moving, or slows down just before stopping, the turning centers of the front wheels FR, FL and the rear wheels RR, RL may be different from each other, This may cause that the criterion in that "the drive axle speed Vd is faster than the rolling axle speed Vr" for determining whether the driving condition of the vehicle is the unstable condition of inside turning or the unstable condition of outside turning is changed. The manager ECU 4, therefore, may pause the driving condition control processes shown in FIGS. 3–5 When the vehicle 5 runs at very low speed, starts moving, or slows down just before stopping. Moreover, in theses cases, the manager ECU 4, when performing the process in step 185, may correct the criterion in that "the drive axle speed Vd is faster than the rolling axle speed Vr" according to the differences of the turning centers of the wheels, and performs the determining process based on the amended criterion.

In the driving condition control system shown in each of the first and second embodiments, the adjustment of the torque is performed by adjusting the engine power or the brake force. In the present invention, it may be possible to use the adjustment of the engine power and that of the brake force in combination, thereby adjusting the torque transferred to the drive axle assembly 11b.

Figure 7A:
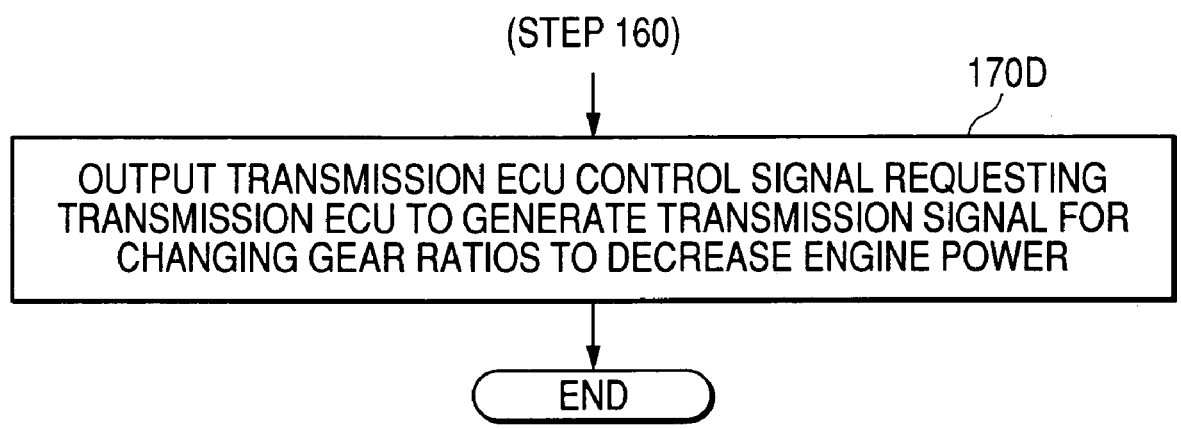
FIG. 7A is a flowchart schematically illustrating a process that the manager ECU executes according to a modification of the present invention.
Figure 7B:
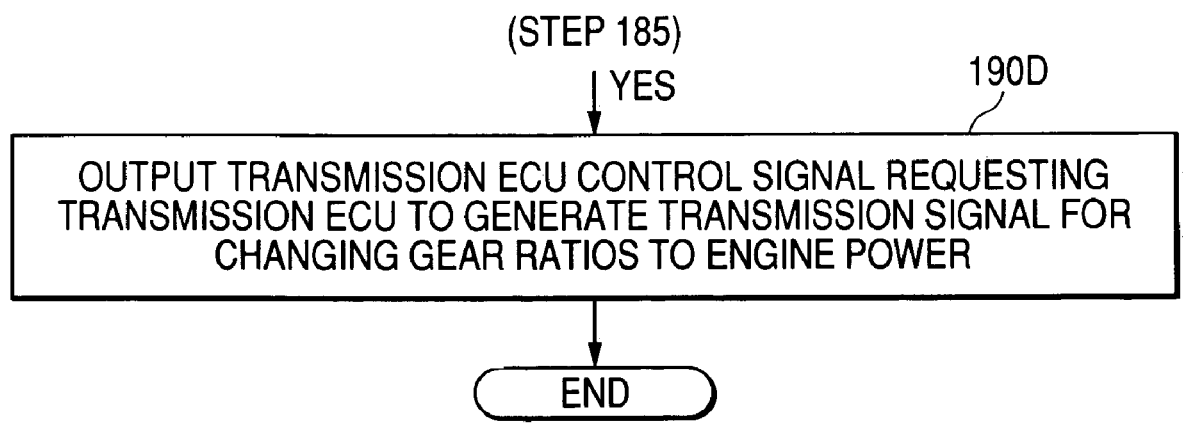
FIG. 7B is a flowchart schematically illustrating a process that the manager ECU executes according to the modification of the present invention.
Figure 8:
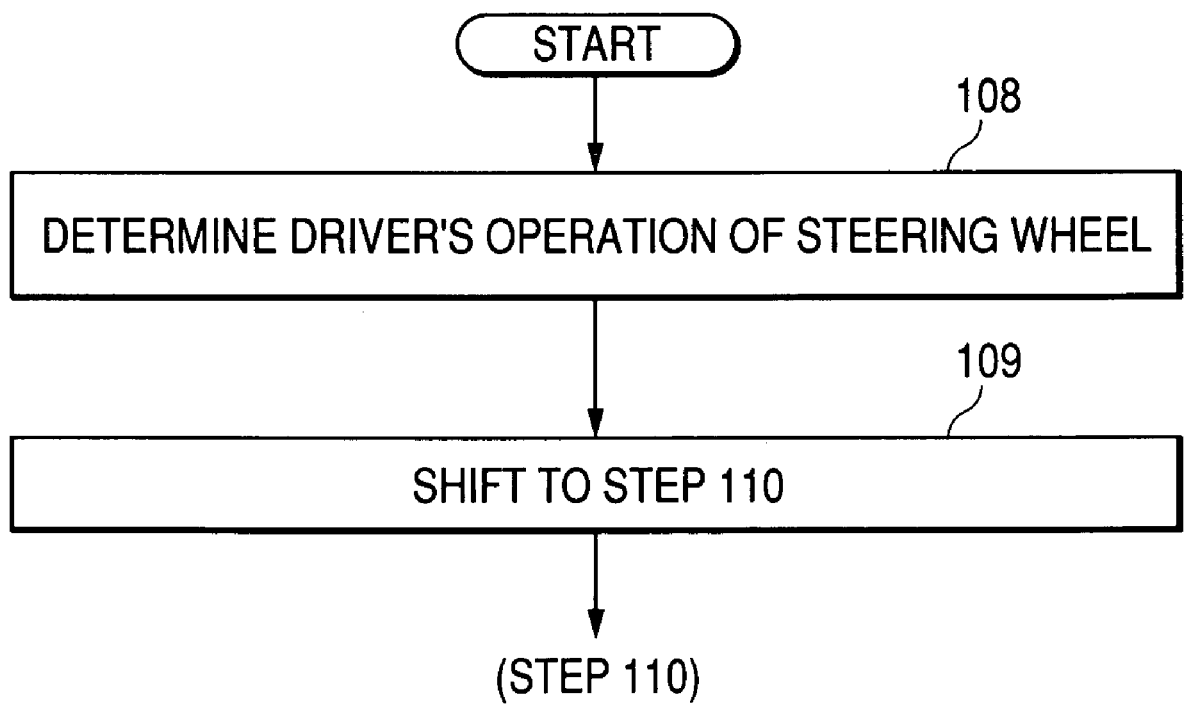
FIG. 8 is a flowchart schematically illustrating a process that the manager ECU executes according to another modification of the present invention.

In addition, the management ECU 4, for decreasing the torque, may output to the transmission ECU 8 the control signal requesting the transmission ECU 8 to generate the transmission signal for changing the gear ratios to decrease the engine power corresponding to the driver's intention (FIG. 7A; step 170D), or to increase the engine power corresponding to the driver's intension (FIG. 7B; step 190D). These controls of the gear ratios allow the torque transferred to the drive axle assembly 11b to be adjusted.

Moreover, the driving condition control system according to each of the first and second embodiments and modifications thereof can overcome the unstable condition of the vehicle V at any time during the running of the vehicle V.

In the present invention, when determining the driver's operation of the steering wheel 12 (FIG. 8; step 108), the manager ECU 4 shifts to step 110 (step 109) to perform these processes in steps 110–190 according to the flowcharts shown in FIGS. 3–8. That is, in this modification, it is possible to perform the driving condition control processes only when the vehicle V is turning.

Incidentally, these steps (processes) shown in FIGS. 3–8 are performed by the manager ECU 4, but they may be performed by at least two of the ECUs in combination, or other one of the ECUs. These steps (processes) shown in FIGS. 3–8 in combination or alone correspond to processing units of the present invention. The driving condition control system according to the present invention may provide a plurality of hard-wired logic circuits that perform these processes in place of the manager ECU 4.

Furthermore, each of the driving condition control systems according to the first and second embodiments and modifications thereof may be installed in another vehicle, such as two-wheel automobile.

While there has been described what is at present considered to be the embodiments and modifications of the invention, it will be understood that various modifications which are not described yet may be made therein, and it is intended to cover in the appended claims all such modifications as fall within the true spirit and scope of the invention.

This application is based upon and claims the benefit of priority of the prior Japanese Patent Application 2003-173854 filed on Jun. 18, 2003 so that the contents of which are incorporated herein by reference.

What is claimed is:

1. A driving condition control system installed in a vehicle, wherein said vehicle has a source of power for generating power, a first rotatable axle assembly to which a first wheel is attached, and a second rotatable axle assembly to which a second wheel is attached, said power being transferred to the second rotatable axle assembly so that the second rotatable axle assembly is rotated, said driving condition control system comprising:
a sensing unit configured to sense a first physical quantity indicative of a rotation of the first rotatable axle assembly and a second physical quantity indicative of a rotation of the second rotatable axle assembly;
a determining unit configured to compare the first and second physical quantities of the rotations of the first and second rotational axle assemblies and to determine whether a driving condition of the vehicle is unstable according to the compared result;
an acceleration detecting unit configured to detect an acceleration of the vehicle and to determine whether the vehicle is being accelerated or being braked according to the detected acceleration; and
an adjusting unit configured to, when the determining unit determines that the driving condition of the vehicle is unstable, adjust the power generated by the source of power in different manners according to the determination result representing that the vehicle is being accelerated or is being braked.

2. A driving condition control system according to claim 1, wherein said sensing unit is configured to sense a first rotational speed of the first rotational axle assembly and a second rotational speed of the second rotational axle assembly as the first and second physical quantities.

3. A driving condition control system according to claim 2, wherein said determining unit is configured to compare the first rotational speed of the first rotational axle assembly and the second rotational speed of the second rotational axle assembly and to determine whether the vehicle becomes a first unstable condition of inside turning or a second unstable condition of outside turning according to the compared result.

4. A driving condition control system according to claim 1, wherein, when the determining unit determines that the driving condition of the vehicle is unstable and the acceleration detecting unit determines that the vehicle is being accelerated, said adjusting unit is configured to decrease the power so that the decreased power is smaller than predetermined power, said predetermined power being set by an operation of a driver in a case where the determining unit determines that the driving condition of the vehicle is stable.

5. A driving condition control system according to claim 1, wherein, when the determining unit determines that the driving condition of the vehicle is unstable and the acceleration detecting unit determines that the vehicle is being accelerated, said adjusting unit is configured to keep the power constant.

6. A driving condition control system according to claim 1, wherein, when the determining unit determines that the driving condition of the vehicle is unstable and the acceleration detecting unit determines that the vehicle is being braked, said adjusting unit is configured to increase the power so that the increased power is larger than predetermined power, said predetermined power being set by an operation of a driver in a case where the determining unit determines that the driving condition of the vehicle is stable.

7. A driving condition control system according to claim 1, wherein, when the determining unit determines that the driving condition of the vehicle is unstable and the acceleration detecting unit detects that the vehicle is being braked, said adjusting unit is configured to perform one of processes to keep the power constant and to decrease the power.

8. A driving condition control system installed in a vehicle, wherein said vehicle has a source of power for generating power, a first rotatable axle assembly to which a first wheel is attached, and a second rotatable axle assembly to which a second wheel is attached, said power being transferred to the second rotatable axle assembly so that the second rotatable axle assembly is rotated, said driving condition control system comprising:
a sensing unit configured to sense a first physical quantity indicative of a rotation of the first rotatable axle assembly and a second physical quantity indicative of a rotation of the second rotatable axle assembly;

a determining unit configured to compare the first and second physical quantities of the rotations of the first and second rotational axle assemblies and to determine whether a driving condition of the vehicle is unstable according to the compared result;

a plurality of brake force generating units mechanically connected to the first and second wheels of the vehicle and configured to generate brake forces to apply the brake forces to the first and second wheels, respectively;

a brake force control unit operatively connected to the plurality of brake force generating units and configured to, when said determining unit determines that the driving condition of the vehicle is unstable, to control the plurality of brake force generating units to generate the brake forces, to adjust the power; and an acceleration detecting unit configured to detect an acceleration of the vehicle and to determine whether the vehicle is being accelerated or being braked according to the detected acceleration, wherein, when the determining unit determines that the driving condition of the vehicle is unstable, said brake force control unit controls the brake forces in different manners according to the determination result representing that the vehicle is being accelerated or is being braked.

9. A driving condition control system according to claim 8, wherein, when the determining unit determines that the driving condition of the vehicle is unstable and the acceleration detecting unit determines that the vehicle is being accelerated, said brake force control unit is configured to adjust the brake forces to decrease them so that the decreased brake forces are smaller than predetermined force, said predetermined force being set by an operation of a driver in a case where the determining unit determines that the driving condition of the vehicle is stable.

10. A driving condition control system according to claim 8, wherein, when the determining unit determines that the driving condition of the vehicle is unstable and the acceleration detecting unit determines that the vehicle is being accelerated, said brake force control unit is configured to adjust the brake forces so that the brake force distributed to the first wheel is different from the brake force distributed to the second wheel.

11. A driving condition control system installed in a vehicle, wherein said vehicle has a source of power for generating power, a first rotatable axle assembly to which a first wheel is attached, and a second rotatable axle assembly to which a second wheel is attached, said power being transferred to the second rotatable axle assembly so that the second rotatable axle assembly is rotated, said driving condition control system comprising:

a sensing unit configured to sense a first rotational speed of the first rotational axle assembly and a second rotational speed of the second rotational axle assembly;

a determining unit configured to compare the first and second rotational speeds of the first and second rotational axle assemblies and to determine whether a driving condition of the vehicle is unstable according to the compared result;

a plurality of brake force generating units mechanically connected to the first and second wheels of the vehicle and configured to generate brake forces to apply the brake forces to the first and second wheels, respectively;

a brake force control unit operatively connected to the plurality of brake force generating units and configured to control the generated brake forces; and an acceleration detecting unit configured to detect an acceleration of the vehicle and to determine whether the vehicle is being accelerated or being braked according to the detected acceleration, wherein, when the determining unit determines that the driving condition of the vehicle is unstable, said brake force control unit controls the brake force generating units to generate the brake forces, thereby adjusting the power by the brake forces, and wherein, when the determining unit determines that the driving condition of the vehicle is unstable, the acceleration detecting unit determines that the vehicle is being braked, and the sensing unit senses that the first rotational speed of the first rotational axle assembly is faster than the second rotational speed of the second rotational axle assembly, said brake force control unit controls the brake forces so that the brake force distributed to the first wheel is smaller than the brake force distributed to the second wheel.

12. A driving condition control system according to claim 11, wherein, when the determining unit determines that the driving condition of the vehicle is unstable, the acceleration detecting unit determines that the vehicle is being braked, and the sensing unit senses that the first rotational speed of the first rotational axle assembly is slower than the second rotational speed of the second rotational axle assembly, said brake force control unit controls the brake forces so that the brake force distributed to the first wheel is larger than the brake force distributed to the second wheel.

13. A driving condition control system installed in a vehicle, wherein said vehicle includes:

a source of power for generating power, a first rotatable axle assembly to which a first wheel is attached, a second rotatable axle assembly to which a second wheel is attached, and an automatic transmission that is provided with a gear box and is mechanically connected between the source of power and the second rotatable axle assembly, said power being transferred to the second rotatable axle assembly so that the second rotatable axle assembly is rotated, said automatic transmission changing gear ratios of the gear box to convert the power generated by the source to torque based on the gear ratios, thereby transferring torque to the second axle assembly, said driving condition control system comprising:

a sensing unit configured to sense a first physical quantity indicative of a rotation of the first rotatable axle assembly and a second physical quantity indicative of a rotation of the second rotatable axle assembly;

a determining unit configured to compare the first and second physical quantities of the rotations of the first and second rotational axle assemblies and to determine whether a driving condition of the vehicle is unstable according to the compared result; and an adjusting unit electrically connected to the automatic transmission and configured to control the automatic transmission to change the gear ratios to thereby adjust the torque.

14. A driving condition control system installed in a vehicle, wherein said vehicle has a source of power for generating power, a first rotatable axle assembly to which a first wheel is attached, and a second rotatable axle assembly to which a second wheel is attached, said power being transferred to the second rotatable axle assembly so that the second rotatable axle assembly is rotated, said driving condition control system comprising:

a sensing unit configured to sense a first physical quantity indicative of a rotation of the first rotatable axle assembly and a second physical quantity indicative of a rotation of the second rotatable axle assembly;

a determining unit configured to compare the first and second physical quantities of the rotations of the first and second rotational axle assemblies and to determine whether a driving condition of the vehicle is unstable according to the compared result; and a turning determining unit configured to determine whether the vehicle is turning, wherein said sensing unit starts to sense the first physical quantity of the rotation of the first rotatable axle assembly and the second physical quantity indicative of the rotation of the second rotatable axle assembly in response to the determination of the turning determining unit that the vehicle is turning.

15. A program product having a computer-readable medium storing therein a program readable by an electronic control unit, said electronic control unit being installed in a vehicle, wherein said vehicle has a source of power for generating power, a first rotatable axle assembly to which a first wheel is attached, a second rotatable axle assembly to which a second wheel is attached, said power being transferred to the second rotatable axle assembly as torque so that the second rotatable axle assembly is rotated, and a sensing unit that senses a first physical quantity indicative of a rotation of the first rotatable axle assembly and a second physical quantity indicative of a rotation of the second rotatable axle assembly, said program causing an electronic control unit to:

receive the first physical quantity indicative of the rotation of the first rotatable axle assembly and the second physical quantity indicative of the rotation of the second rotatable axle assembly from the sensing unit;

compare the first and second physical quantities of the rotations of the first and second rotational axle assemblies;

determine whether a driving condition of the vehicle is unstable according to the compared result;

detect an acceleration of the vehicle to determine whether the vehicle is being accelerated or being braked according to the detected acceleration; and when the determining step determines that the driving condition of the vehicle is unstable, adjust the power generated by the source of power in different manners according to the determination result representing that the vehicle is being accelerated or is being braked.

16. A method of controlling a driving condition of a vehicle, wherein said vehicle has a source of power for generating power, a first rotatable axle assembly to which a first wheel is attached, and a second rotatable axle assembly to which a second wheel is attached, said power being transferred to the second rotatable axle assembly so that the second rotatable axle assembly is rotated, said method comprising:

sensing a first physical quantity indicative of a rotation of the first rotatable axle assembly and a second physical quantity indicative of a rotation of the second rotatable axle assembly;

comparing the first and second physical quantities of the rotations of the first and second rotational axle assemblies to determine whether a driving condition of the vehicle is unstable according to the compared result detecting an acceleration of the vehicle to determine whether the vehicle is being accelerated or being braked according to the detected acceleration; and when the comparing step determines that the driving condition of the vehicle is unstable, adjusting the power generated by the source of power in different manners according to the determination result representing that the vehicle is being accelerated or is being braked.

17. A method of controlling a driving condition of a vehicle according to claim 16, wherein said sensing step includes sensing a first rotational speed of the first rotational axle assembly and a second rotational speed of the second rotational axle assembly as the first and second physical quantities.

18. A method of controlling a driving condition of a vehicle according to claim 17, wherein said comparing step includes comparing the first rotational speed of the first rotational axel assembly and the second rotational speed of the second rotational assembly to determine whether the vehicle becomes a first unstable condition of inside turning or a second unstable condition of outside turning according to the compared result.

19. A method of controlling a driving condition of a vehicle according to claim 16, wherein, when the comparing step determines that the driving condition of the vehicle is unstable and the detecting step determines that the vehicle is being accelerated, said adjusting step decreases the power so that the decreased power is smaller than predetermined power, said predetermined power being set by an operation of a driver in a case where the determining step determines that the driving condition of the vehicle is stable.

20. A method of controlling a driving condition of a vehicle according to claim 16, wherein, when the comparing step determines that the driving condition of the vehicle is unstable and the detecting step determines that the vehicle is being accelerated, said adjusting step keeps the power constant.

21. A method of controlling a driving condition of a vehicle according to claim 16, wherein, when the comparing step determines that the driving condition of the vehicle is unstable and the detecting step determines that the vehicle is being braked, said adjusting step increases the power so that the increased power is larger than predetermined power, said predetermined power being set by an operation of a driver in a case where the determining step determines that the driving condition of the vehicle is stable.

22. A method of controlling a driving condition of a vehicle according to claim 16, wherein, when the comparing step determines that the driving condition of the vehicle is unstable and the detecting step detects that the vehicle is being braked, said adjusting step performs one of processes to keep the power constant and to decrease the power.

23. A method of controlling a driving condition of a vehicle, wherein said vehicle has a source of power for generating power, a first rotatable axle assembly to which a first wheel is attached, and a second rotatable axle assembly to which a second wheel is attached, said power being transferred to the second rotatable axle assembly so that the second rotatable axle assembly is rotated, said method comprising:

sensing a first physical quantity indicative of a rotation of the first rotatable axle assembly and a second physical quantity indicative of a rotation of the second rotatable axle assembly;

comparing the first and second physical quantities of the rotations of the first and second rotational axle assemblies to determine whether a driving condition of the vehicle is unstable according to the compared result;

generating brake forces to apply the brake forces to the first and second wheels, respectively;

when said comparing step determines that the driving condition of the vehicle is unstable, controlling the generated brake forces to adjust the power;

detecting an acceleration of the vehicle to determine whether the vehicle is being accelerated or being braked according to the detected acceleration; and wherein, when the detecting step determines that the vehicle is being accelerated or being braked, said controlling step controls the brake forces in different manners according to the determination result representing that the vehicle is being accelerated or is being braked.

24. A method of controlling a driving condition of a vehicle according to claim 23, wherein, when the comparing step determines that the driving condition of the vehicle is unstable and the detecting step determines that the vehicle is being accelerated, said controlling step decreases the brake forces so that the decreased brake forces are smaller than predetermined force, said predetermined force being set by an operation of a driver in a case where the determining unit determines that the driving condition of the vehicle is stable.

25. A method of controlling a driving condition of a vehicle according to claim 23, wherein, when the comparing step determines that the driving condition of the vehicle is unstable and the detecting step determines that the vehicle is being accelerated, said controlling step controls the brake forces so that the brake force distributed to the first wheel is different from the brake force distributed to the second wheel.

26. A method of controlling a driving condition of a vehicle, wherein said vehicle has a source of power for generating power, a first rotatable axle assembly to which a first wheel is attached, and a second rotatable axle assembly to which a second wheel is attached, said power being transferred to the second rotatable axle assembly so that the second rotatable axle assembly is rotated, said method comprising:

sensing a first rotational speed of the first rotatable axle assembly and a second rotational speed of the second rotatable axle assembly;

comparing the first and second rotational speeds of the first and second rotational axle assemblies to determine whether a driving condition of the vehicle is unstable according to the compared result;

generating brake forces to apply the brake forces to the first and second wheels, respectively;

controlling the generated brake forces; and detecting an acceleration of the vehicle to determine whether the vehicle is being accelerated or being braked according to the detected acceleration, wherein, when the comparing step determines that the driving condition of the vehicle is unstable, said controlling step uses the generated brake forces to adjust the torque and wherein, when the comparing step determines that the driving condition of the vehicle is unstable, the detecting step determines that the vehicle is being braked, and the sensing step senses that the first rotational speed of the first rotational axle assembly is faster than the second rotational speed of the second rotational axle assembly, said controlling step controls the brake forces so that the brake force distributed to the first wheel is smaller than the brake force distributed to the second wheel.

27. A method of controlling a driving condition of a vehicle according to claim 26, wherein, when the comparing step determines that the driving condition of the vehicle is unstable, the detecting step determines that the vehicle is being braked, and the sensing step senses that the first rotational speed of the first rotational axle assembly is slower than the second rotational speed of the second rotational axle assembly, said controlling step controls the brake forces so that the brake force distributed to the first wheel is larger than the brake force distributed to the second wheel.

* * * * *